United States Patent
Kurosawa

(10) Patent No.: US 7,365,475 B2
(45) Date of Patent: Apr. 29, 2008

(54) ULTRASONIC MOTOR

(75) Inventor: Yuichi Kurosawa, Tokyo (JP)

(73) Assignee: PENTAX Corporation, Tokyo (JP)

(*) Notice: Subject to any disclaimer, the term of this patent is extended or adjusted under 35 U.S.C. 154(b) by 45 days.

(21) Appl. No.: 11/549,996

(22) Filed: Oct. 17, 2006

(65) Prior Publication Data
US 2007/0085448 A1  Apr. 19, 2007

(30) Foreign Application Priority Data
Oct. 18, 2005  (JP) .............................. 2005-302459

(51) Int. Cl.
*H02N 2/00* (2006.01)
(52) U.S. Cl. ..................... 310/323.09; 310/323.08; 310/323.02
(58) Field of Classification Search ........... 310/323.01, 310/323.02, 323.08, 323.09, 323.13
See application file for complete search history.

(56) References Cited

U.S. PATENT DOCUMENTS 4,965,482 A * 10/1990 Ohnishi et al. ........ 310/323.13
5,247,220 A * 9/1993 Miyazawa et al. ...... 310/323.05
5,296,776 A * 3/1994 Wind et al. ............ 310/323.02

FOREIGN PATENT DOCUMENTS

JP    2000-060154         2/2000
JP    2002-354852 A  * 12/2002

OTHER PUBLICATIONS

U.S. Appl. No. 11/470,774 to Kurosawa, which was filed Sep. 7, 2006.
U.S. Appl. No. 11/532,244 to Kurosawa, which was filed Sep. 15, 2006.

* cited by examiner

*Primary Examiner*—Thomas M. Dougherty
(74) *Attorney, Agent, or Firm*—Greenblum & Bernstein, P.L.C.

(57) ABSTRACT

An ultrasonic motor includes a circular stator having a piezoelectric element and a comb-tooth body having a plurality of comb teeth which are circumferentially arranged thereon, and a circular rotor having a rotation shaft, the circular rotor being in press-contact with the comb teeth of the circular stator. The circular rotor is provided with a projection which is in the press-contact with the comb teeth, wherein a width of the projection is smaller than a radial width of the comb teeth, and wherein a radial position of the projection varies along a circumferential direction of the circular rotor.

9 Claims, 9 Drawing Sheets

Prior Art

ULTRASONIC MOTOR

BACKGROUND OF THE INVENTION

1. Field of the Invention

The present invention relates to an ultrasonic motor, and in particular, relates to an ultrasonic motor whose service life is prolonged by reducing frictional wear between a rotor and a stator.

2. Description of the Prior Art

An ultrasonic motor includes a stator having a plurality of circumferentially arranged piezoelectric elements and a rotatable rotor in the form of an annular plate or a circular plater which is in press contact with the stator at a predetermined pressure. The rotor is provided with an abutment surface, and the stator is provided with corresponding abutment surfaces on a comb-tooth body in the peripheral direction thereof. When a high-frequency voltage is applied to the piezoelectric elements of the stator, the piezoelectric elements vibrate. The vibration is amplified in the circumferential direction by comb teeth integral with the piezoelectric elements and causes a progressive-wave motion of the comb teeth in the circumferential direction. As a result, the rotor which is in friction-contact with the piezoelectric elements rotates about an axis thereof. To this end, it is necessary to provide a mechanism to press the rotor against the stator, and hence, ultrasonic motors using a spring as a pressure source have been proposed in the prior art.

In the ultrasonic motor disclosed in Japanese Unexamined Patent Publication No. 2000-60154, a circular disc portion surrounded by the peripheral wall of the rotor, which is in the form of a short cylinder, defines a thin disc spring which provides a spring force to press the peripheral wall portion of the rotor against the comb-tooth body of the stator. In this structure, no coil spring is necessary, and thus a thinner ultrasonic motor can be achieved.

In this known ultrasonic motor, the width of an abutment surface of a peripheral wall portion of the rotor in the radial direction is smaller than the width of corresponding abutment surfaces of the comb-tooth body of the stator in the radial direction. The peripheral wall portion of the rotor is provided with an annular projection. The annular projection makes the width of the abutment surface of the rotor smaller than the width of the abutment surface of the stator so as to determine the frictional force by the width of the abutment surface of the rotor whereby the frictional force produced at the abutment surfaces of the rotor and the stator can be set to a desired value. The annular projection ensures that if the position of the rotor is deviated from the stator in the radial direction, due to parts tolerance or assembly tolerance when the rotor is assembled with the stator, the entire abutment surface of the rotor can be pressed against the abutment surface of the stator.

In this conventional ultrasonic motor, only at a part of each abutment surface of the comb teeth in the radial direction (width direction) are continuously pressed onto the abutment surface of the annular projection of the rotor. Consequently, the abutment surfaces of the comb teeth are partly worn only at the portion thereof that is always in press contact with the abutment surface of the annular projection. As a result, a depression or groove due to partial wearing is produced in the abutment surfaces of the comb teeth. The depressions or grooves cause an abnormal press-contact between the abutment surfaces of the rotor and the stator, so that an abnormal rotation such as an irregular or eccentric rotation of the rotor occurs due to an irregular frictional force. This reduces the service life of the ultrasonic motor.

SUMMARY OF THE INVENTION

The present invention provides an ultrasonic motor which restricts occurrence of partial wearing of the abutment surfaces of the rotor and the stator, so that no irregular rotation of the rotor takes place and the service life thereof can be prolonged.

According to an aspect of the present invention, an ultrasonic motor is provided, including a circular stator having a piezoelectric element and a comb-tooth body having a plurality of comb teeth which are circumferentially arranged thereon; and a circular rotor having a rotation shaft, the circular rotor being in press-contact with the comb teeth of the circular stator. The circular rotor is provided with a projection which is in the press-contact with the comb teeth, wherein a width of the projection is smaller than a radial width of the comb teeth, and wherein a radial position of the projection varies along a circumferential direction of the circular rotor.

It is desirable for the width of the projection in the radial direction to be determined so as to provide a predetermined frictional force due to the press-contact with the comb teeth.

It is desirable for a shape of the projection, as viewed in an axial direction of the rotation shaft, to be determined so that the projection contacts substantially the entire area of abutment surfaces of the comb teeth in the radial direction upon one entire rotation of the circular rotor.

The shape of the projection can be circular and eccentric with respect to the rotation shaft of the circular rotor.

The shape of the projection can be elliptical.

It is desirable for an outer periphery of the projection to inscribe an outer periphery of the comb teeth at a plurality of equi-angular portions and circumscribe an inner periphery of the comb teeth at portions connecting the plurality of equi-angular portions, as viewed in the axial direction.

Each of the portions connecting the plurality of equi-angular portions can be a linear portion.

The projection can include a plurality of equi-angular arc portions provided at different radial positions.

The shape of the projection can be a spiral shape.

According to the present invention, when the rotor rotates, the press-contact surface (abutment surface) of the projection of the rotor is rotated while being in press contact with the abutment surface of the comb teeth of the stator and while varying the radial position of the abutment surface of the rotor relative to the abutment surface of the comb teeth. Therefore, the entire abutment surfaces of the rotor and the comb teeth wear substantially uniformly, so that no partial wearing of the abutment surface of the stator occurs. Accordingly, no abnormal rotation of the motor takes place, and the service life of the ultrasonic motor can be prolonged.

The present disclosure relates to subject matter contained in Japanese Patent Application No. 2005-302459 (filed on Oct. 18, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
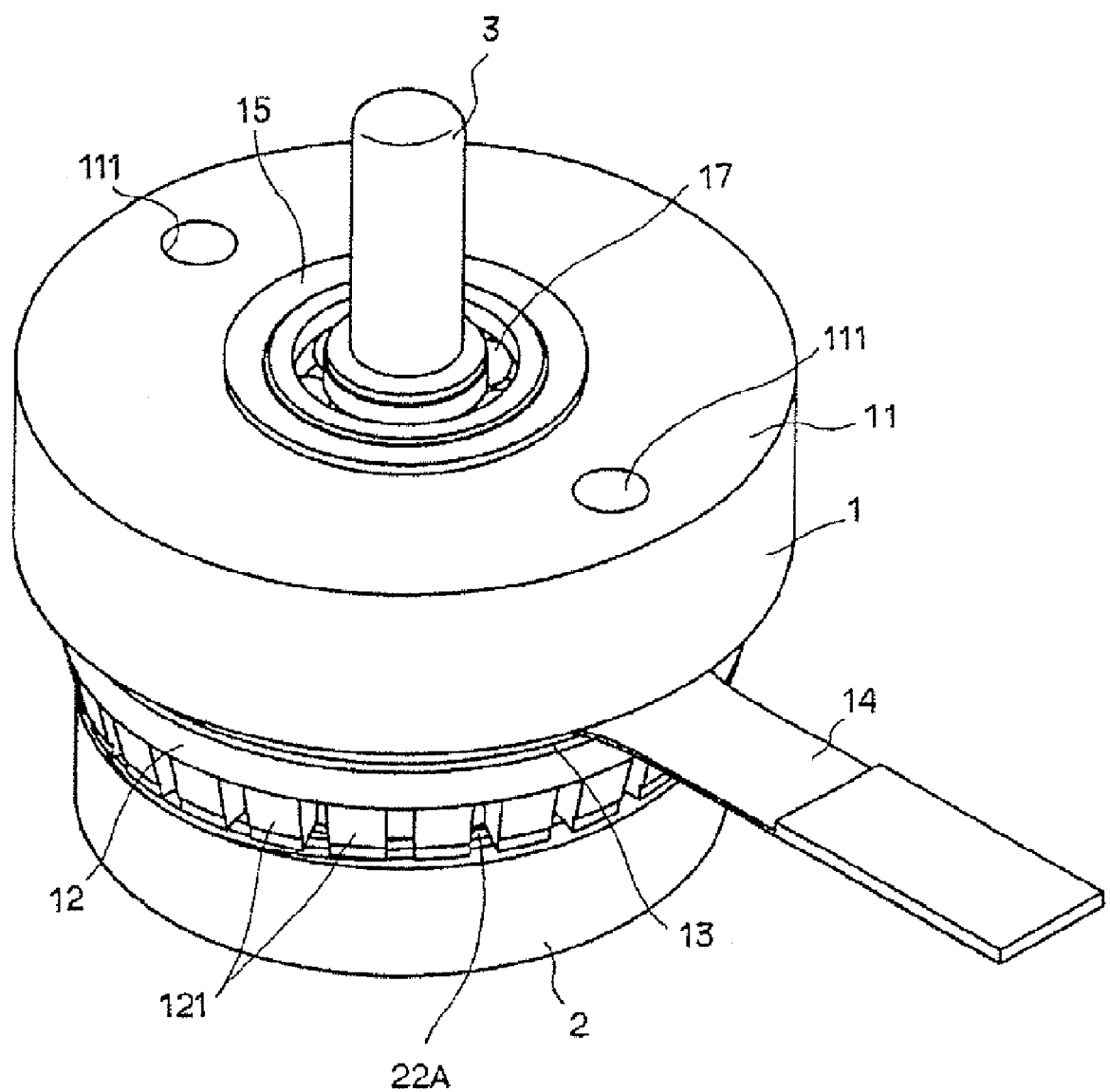
FIG. 1 is a perspective view of an ultrasonic motor according to a first embodiment of the present invention.
Figure 2:
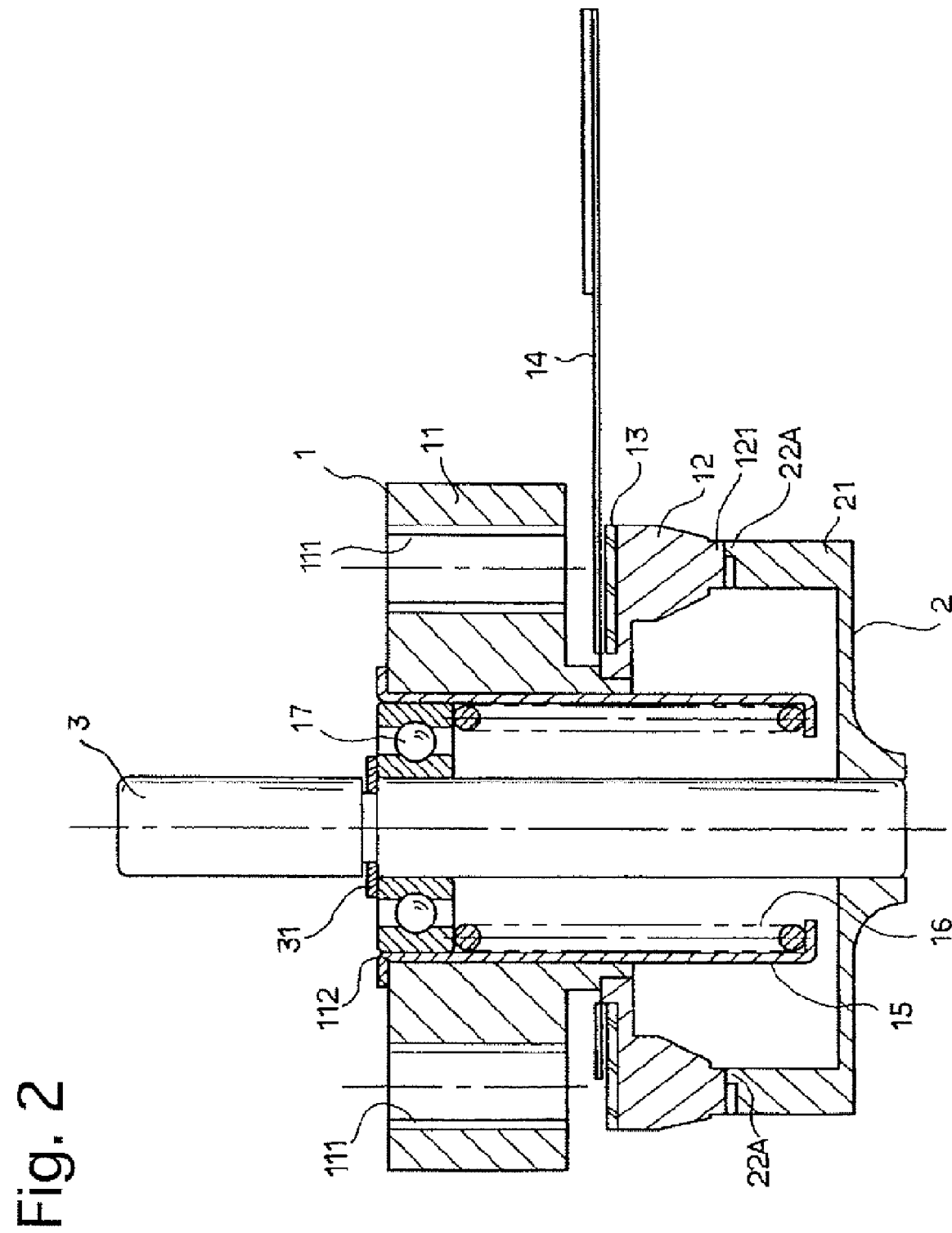
FIG. 2 is an axial sectional view of an ultrasonic motor shown in FIG. 1.
Figure 3:
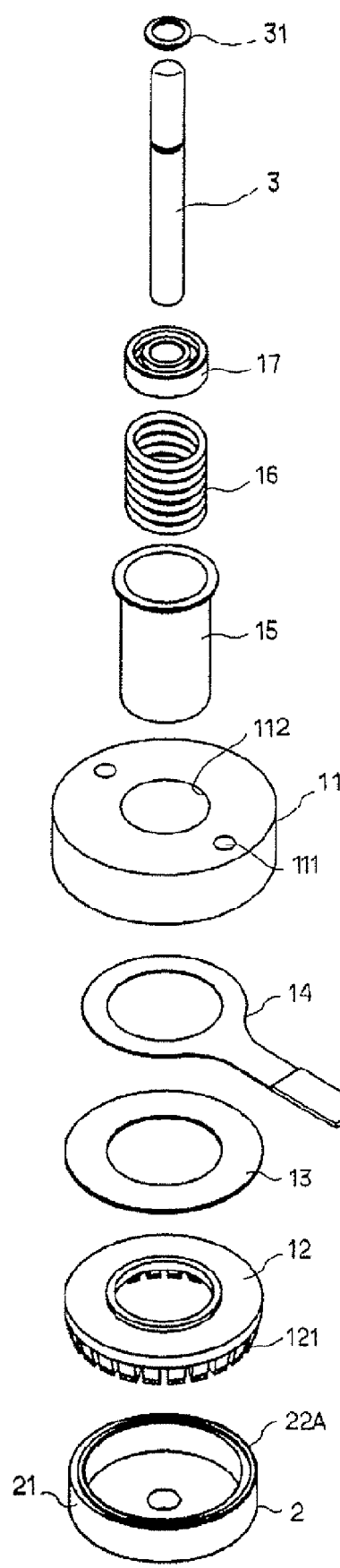
FIG. 3 is an exploded perspective view of components of an ultrasonic motor shown in FIG. 1.

Embodiments of the present invention will be discussed below with reference to the drawings. FIG. 1 is a perspective view of a first embodiment of an ultrasonic motor according to the present invention and FIG. 2 is a longitudinal sectional view thereof. FIG. 3 is an exploded perspective view of the first embodiment. As shown in FIGS. 1 through 3, a comb-tooth body 12, which is in the form of a short circular cylindrical container and has a plurality of comb teeth 121 arranged in the circumferential direction, is formed integrally with a lower portion of a circular base 11 having a motor mounting holes 111. The comb-tooth body 12 is provided on its upper surface with a circular piezoelectric element 13 in the form of a circular thin disc, which is polarized in the circumferential direction. The piezoelectric element 13 and the comb-tooth body 12 constitute a stator 1. A high-frequency voltage is applied to the piezoelectric element 13 through a flexible circuit board 14. The circular base 11 has a central shaft hole 112 in which a cylindrical sleeve 15 is secured. A ball bearing 17 is provided in the sleeve 15, so that a rotation shaft 3 is rotatably supported by the ball bearing 17. The axial displacement of the rotation shaft 3 is restricted by a washer 31. A circular rotor 2, in the form of a short cylinder, is attached to the rotation shaft 3 and has a peripheral wall portion 21 whose upper surface abuts against the comb-teeth 121 of the comb-tooth body 12. A compression coil spring 16 is inserted between the lower end of the sleeve 15 and the ball bearing 17 in the axial direction, so that the axial spring force of the compression coil spring 16 biases the ball bearing 17 and the rotation shaft 3 upward to thereby cause the rotor 2 to come into press contact with the comb teeth 121 of the stator 1.

The piezoelectric element 13 is provided with polarization patterns (not shown) in the circumferential direction. The piezoelectric element 13 is adhered onto the upper surface of the comb-tooth body 12 by an adhesive at a position so that each polarization pattern opposes each comb-tooth 121 of the comb-tooth body 12. The piezoelectric element 13 is provided on its upper surface with electrodes (not shown) via which a voltage is applied to the piezoelectric element 13. The electrodes are connected to the flexible circuit board 14 so that a predetermined high frequency voltage can be applied to the piezoelectric element 13 through the flexible circuit board 14.

Embodiment 1

Figure 4A:
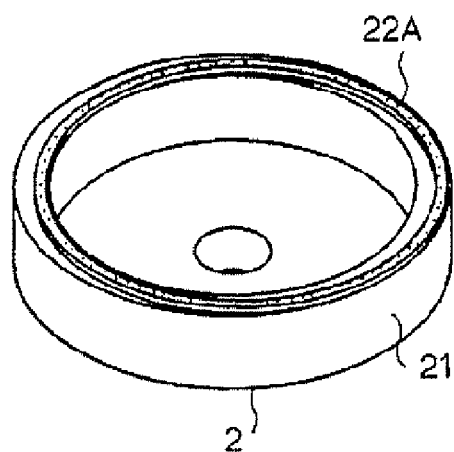
FIGS. 4A and 4B are a perspective view and a plan view of the first embodiment of a rotor according to the present invention.
Figure 4B:
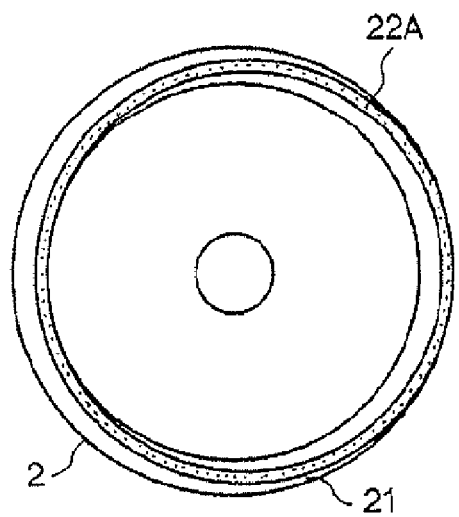

FIGS. 4A and 4B show an enlarged perspective view and a plan view of the rotor 2, respectively. The cylindrical peripheral wall portion 21 of the rotor 2 is provided with an annular end surface. The outer and inner diameters of the annular end surface are substantially identical to those of the end surfaces of the comb teeth 121. The annular end surface of the rotor 2 is provided with an axially extending projection 22A whose end surface defines an abutment surface.

In the first embodiment, the projection 22A has a uniform width in the radial direction, so that a predetermined value of frictional force can be obtained between the abutment surfaces of the rotor and the comb teeth 121. Moreover, the shape of the projection 22A is circular, analogous to the circular peripheral wall portion 2 as viewed in the axial direction. However, the center of the projection 22A is slightly eccentric in one direction with respect to the center of the rotor 2 so that the radial position of the projection 22A varies along the circumferential direction of the rotor 2. Namely, in an axial view (the plan view shown in FIG. 4B), the outer peripheral surface of the projection 22A inscribes the outer peripheral surface of the peripheral wall portion 21 at one side in the eccentric direction of the center of the projection 22A, whereas the inner peripheral surface of the projection 22A circumscribes the inner peripheral surface of the peripheral wall portion 21 at the diametrically opposite side thereof. In other words, in a plan view, if the outer and inner peripheral surfaces of the peripheral wall portion 21 are identical to the respective outer and inner peripheries of the abutment surfaces of the comb teeth 121 in the radial direction, the outer peripheral surface of the projection 22A inscribes the outer periphery of the comb teeth 121 at one side and the inner peripheral surface of the projection 22A circumscribes the inner periphery of the comb teeth 121 at the diametrically opposite side.

In the ultrasonic motor of the first embodiment, a high-frequency voltage in the ultrasonic range, for example higher than 20 KHz is applied to the piezoelectric element 13 through the flexible circuit board 14, so that the circumferentially polarized piezoelectric element 13 vibrates in the thickness direction thereof. The vibration of the piezoelectric element 13 is transmitted to the comb-tooth body 12 integral therewith. As a result, the comb-tooth body 12 vibrates in the thickness direction thereof. The vibration of the comb-tooth body 12 is converted to a vibration whose amplitude is amplified in the circumferential direction by the comb teeth 121 which are provided spaced apart from each other in the circumferential direction. Consequently, the peripheral wall portion 21 of the rotor 2 which frictionally engages with the abutment surfaces of the comb teeth 121 is driven due to friction in accordance with the displacement of the comb teeth 121 in the thickness direction and the circumferential direction thereof. Accordingly, the rotor 2 is driven to rotate and the rotation of the rotor 2 is transmitted to the rotation shaft 3. The rotation of the rotation shaft 3 is used to rotate an external device (not shown) through a gear transmission mechanism (not shown), etc.

Figure 5A:
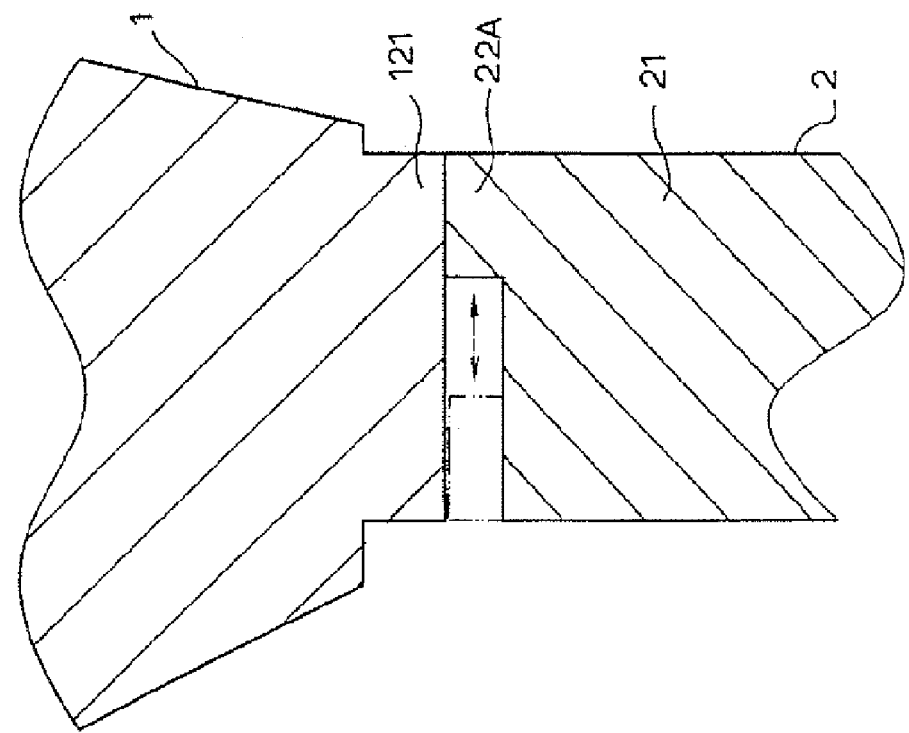
FIGS. 5A and 5B are sectional views showing the worn abutment surfaces of the rotor and the stator.
Figure 5B:
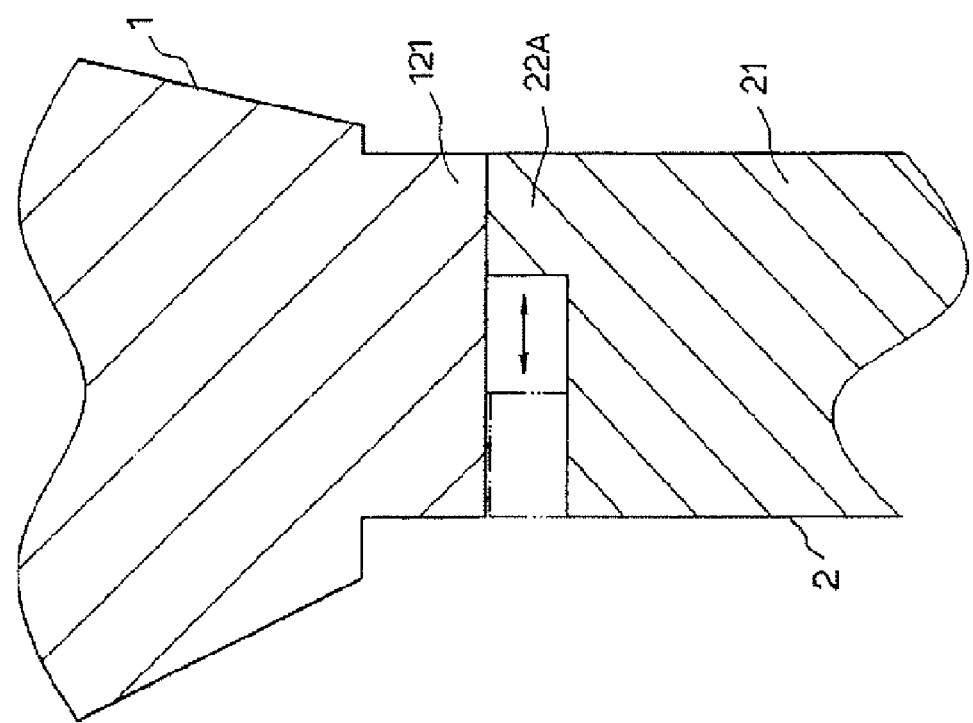

In the first embodiment, the abutment surface of the projection 22A of the rotor 2 is pressed against the abutment surfaces of the comb teeth 121 of the stator 1 due to the spring force of the compression coil spring 16, and the rotor 2 rotates in this state. FIG. 5A shows a sectional view of the projection 22A and the comb tooth 121 which is pressed against the projection 22A. In the first embodiment, the projection 22A is eccentric with respect to the peripheral wall portion 21 and with respect to the abutment surface of the comb tooth 121 of the stator 1. Therefore, the projection 22A is pressed against the abutment surface of the comb tooth 121 while moving in a radial direction as indicated by the arrows in FIG. 5A in accordance with the rotation of the rotor 2. Consequently, the projection 22A rotates while in sliding contact with substantially the entire abutment surfaces of the comb teeth 121 upon one entire rotation of the projection 22A (rotor 2). Accordingly, the wearing of the abutment surfaces of the projection 22A of the rotor 2 and the comb teeth 121 occurs uniformly over the entire abutment surfaces thereof, as shown in FIG. 5B. Thus, no partial wearing of the abutment surfaces of the comb teeth occurs, and hence, no abnormal rotation of the motor occurs, thus resulting in a prolonged service life of the ultrasonic motor.

Embodiment 2

Figure 6A:
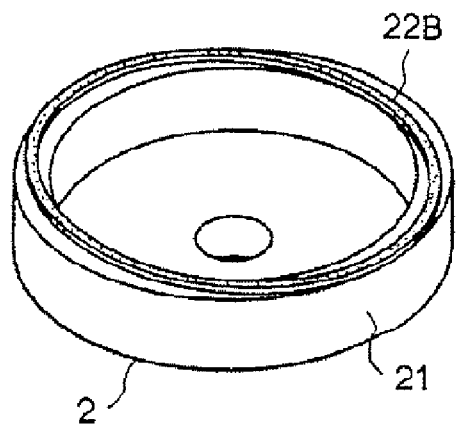
FIGS. 6A and 6B are a perspective view and a plan view of a second embodiment of a rotor according to the present invention.
Figure 6B:
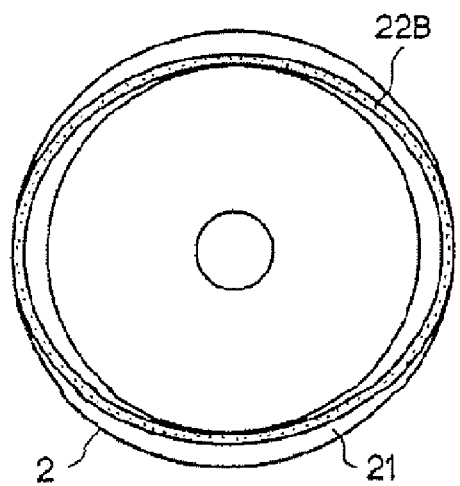

FIGS. 6A and 6B show an enlarged perspective view and a plan view of a rotor 2 of an ultrasonic motor according to a second embodiment of the present invention, respectively. In the second embodiment, a projection 22B provided on the rotor 2 has a uniform width in the radial direction so that a predetermined value of frictional force at the abutment surfaces of the stator 1 and the comb teeth 121 can be obtained, as in the first embodiment. Unlike the first embodiment, the shape of the projection 22B is elliptical in an axial view (the plan view shown in FIG. 4B), and the outer peripheral surface thereof in the major diameter direction of the elliptical shape thereof has an outer diameter substantially identical to the outer peripheral wall portion 21 of the rotor 2, and the inner peripheral surface in the minor diameter direction of the elliptical shape thereof has an inner diameter substantially identical to the peripheral wall portion 21. In other words, the outer peripheral surface of the projection 22B in the major diameter direction inscribes the outer peripheral surface of the peripheral wall portion 21, and the inner peripheral surface of the projection 22B in the minor diameter direction circumscribes the inner peripheral surface of the peripheral wall portion 21. Namely, in a plan view, the outer peripheral surface of the projection 22B inscribes the outer periphery of the comb teeth 121 in the major diameter direction of the projection 22B, and the inner peripheral surface of the projection 22B circumscribes the inner periphery of the comb teeth 121 in the minor diameter direction of the projection 22B.

In the second embodiment, the projection 22B is displaced in a radial direction relative to the abutment surfaces of the comb teeth 121 of the stator 1 when the rotor 2 rotates, and hence, the projection 22B rotates while in sliding contact with substantially the entire abutment surfaces of the comb teeth 121 upon one entire rotation of the projection 22B (rotor 2). Consequently, the wearing of the abutment surfaces of the rotor 2 and the stator 1 occurs substantially over the whole abutment surface, and thus no partial wearing of the abutment surface of the stator 1 occurs, and hence, no abnormal rotation of the rotor occurs, thus resulting in prolonged service life of the ultrasonic motor.

Embodiment 3

Figure 7A:
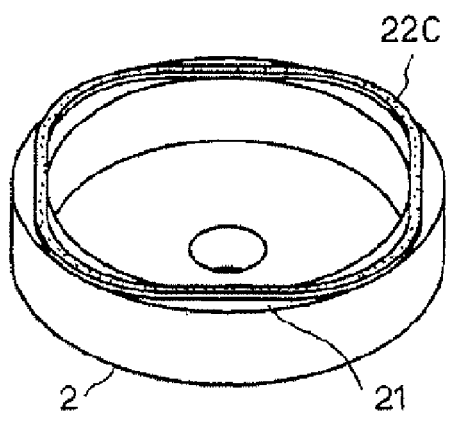
FIGS. 7A and 7B are a perspective view and a plan view of a third embodiment of a rotor according to the present invention.
Figure 7B:
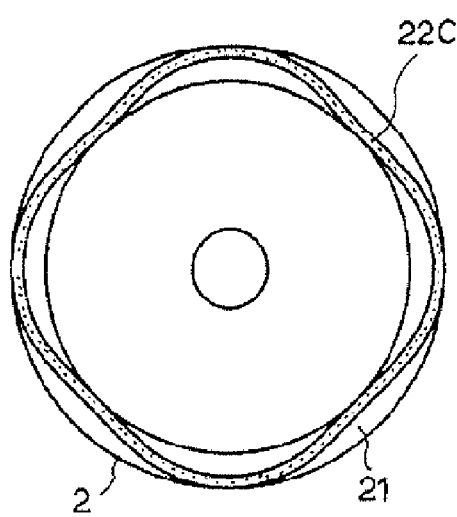

FIGS. 7A and 7B show an enlarged perspective view and a plan view of a rotor 2 of an ultrasonic motor according to a third embodiment of the present invention. In the third embodiment, a projection 22C provided on the rotor 2 is divided into four equi-angular sections, each of which includes an outer peripheral surface portion which inscribes the outer peripheral surface of the peripheral wall portion 21 of the rotor 2 (i.e., the outer periphery of the comb teeth 121) and an inner peripheral surface portion which circumscribes the inner peripheral surface of the peripheral wall portion 21 (i.e., the inner periphery of the comb teeth 121), in the plan view thereof as shown in FIG. 7B, so that the outer peripheral surface portions of the projection 22C are interconnected via straight peripheral surface portions and the inner peripheral surface portions of the projection 22C are interconnected via curved peripheral surface portions. Namely, the outer peripheral surface of the projection 22C inscribes the outer periphery of the comb teeth 121 at four portions (four equi-angular sections) and the four portions of the projection 22C are connected to each other by linear (straight) portions which circumscribe the inner periphery of the comb teeth 121. In this embodiment, the projection 22C is displaced in the radial direction relative to the abutment surfaces of the comb teeth 121 of the stator 1 when the rotor 2 rotates, and hence, the projection 22C rotates while in sliding contact with substantially the entire abutment surfaces of the comb teeth 121 upon one entire rotation of the projection 22C (rotor 2). Accordingly, the wearing of the abutment surfaces of the projection 22C of the rotor 2 and the comb teeth 121 of the stator 1 occurs substantially over the whole abutment surface, and thus no partial wearing of the abutment surface of the comb teeth 121 occurs, and hence, no abnormal rotation of the rotor occurs, thus resulting in prolonged service life of the ultrasonic motor.

Embodiment 4

Figure 8A:
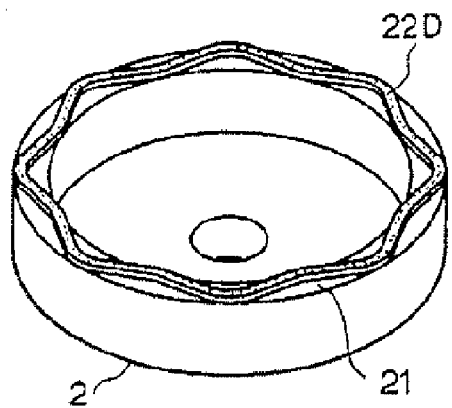
FIGS. 8A and 8B are a perspective view and a plan view of a fourth embodiment of a rotor according to the present invention.
Figure 8B:
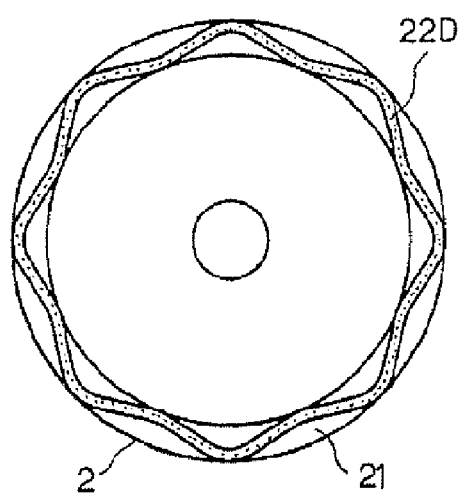

FIGS. 8A and 8B show an enlarged perspective view and a plan view of a rotor 2 of an ultrasonic motor according to a fourth embodiment of the present invention. In the fourth embodiment, a projection 22D provided on the rotor 2 is divided into eight equi-angular sections, in the circumferential direction, and inscribes the outer peripheral surface of the peripheral wall portion 21 of the rotor 2 at the eight portions in the plan view shown in FIG. 8B. The inner peripheral surface of the projection 22D circumscribes the inner peripheral surface of the peripheral wall portion 21 at eight intermediate portions of the projection 22D located between the adjacent inscribing portions with the outer peripheral surfaces of the peripheral wall portion 21. The sixteen alternate inscribing/circumscribing portions of the projection 22D are interconnected by straight portions, so that the projection 22D has a petal shape. In this embodiment, the projection 22D is displaced in the radial direction relative to the abutment surfaces of the comb teeth 121 of the stator 1 when the rotor 2 rotates, and hence, the projection 22D rotates while in sliding contact with substantially the entire abutment surfaces of the comb teeth 121 upon one entire rotation of the projection 22D (rotor 2). Consequently, the wearing of the abutment surfaces of the rotor 2 and the stator 1 occurs substantially over the whole abutment surface, and thus no partial wearing of the abutment surface of the stator 1 occurs, and hence, no abnormal rotation of the rotor occurs, thus resulting in prolonged service life of the ultrasonic motor.

Embodiment 5

Figure 9:
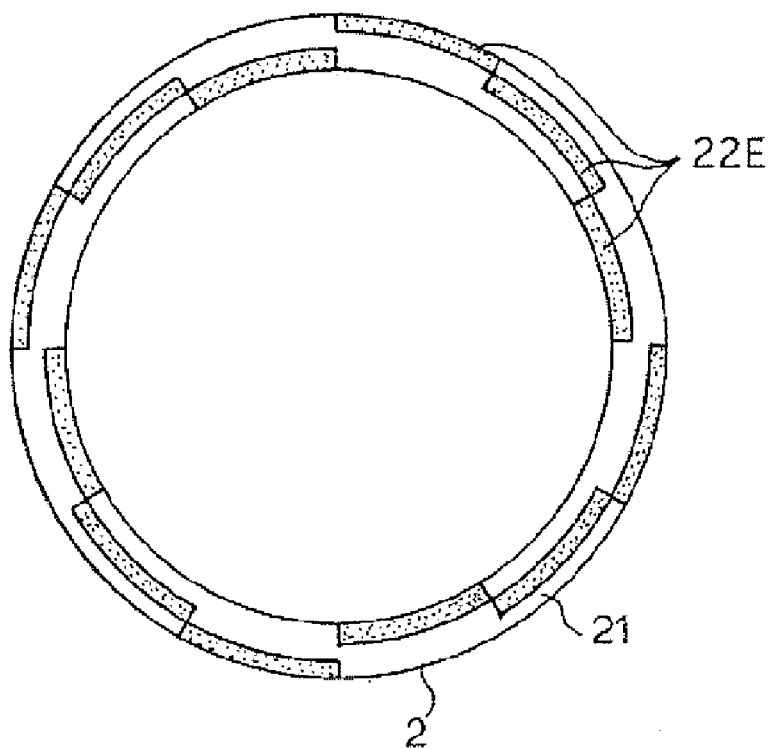
FIG. 9 is a plan view of a fifth embodiment of a rotor according to the present invention.

FIG. 9 shows a plan view of a rotor 2 of an ultrasonic motor according to a fifth embodiment of the present invention. In the fifth embodiment, a projection 22E provided on the rotor 2 is divided into twelve projection pieces in the circumferential direction and are located at different radial positions. The twelve projection pieces are divided into four groups, each consisting of three projection pieces that are arranged in three different radial and circumferential positions, so that the four groups of projection pieces are successively arranged in the circumferential direction.

Embodiment 6

Figure 10:
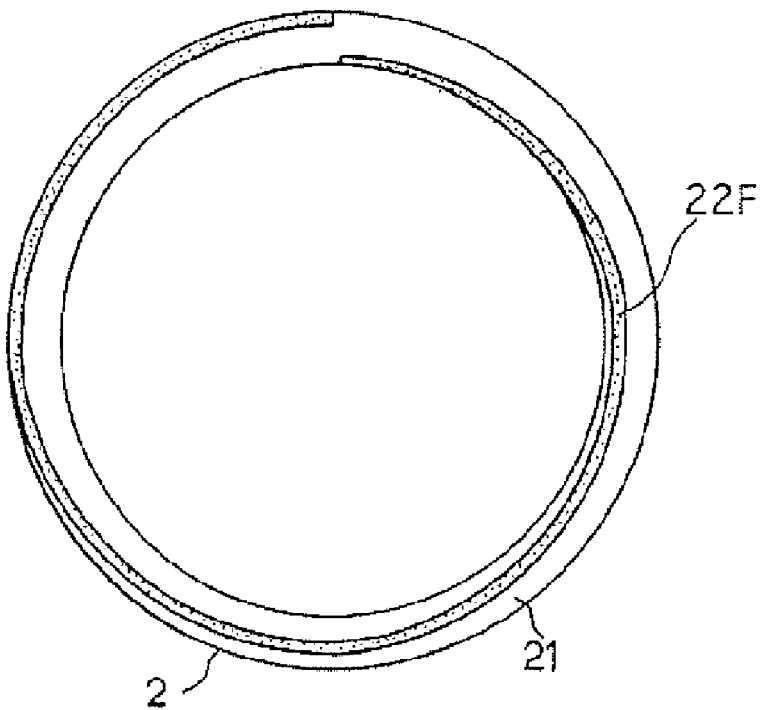
FIG. 10 is a plan view of a sixth embodiment of a rotor according to the present invention.

FIG. 10 shows a plan view of a rotor of an ultrasonic motor according to a sixth embodiment of the present invention. In the sixth embodiment, a projection 22F provided on the rotor 2 is spiral in shape in an axial view (the plan view shown in FIG. 10). The spiral projection 22F partially inscribes the outer peripheral surface of the peripheral wall portion 21 at the outer peripheral surface at one end of the projection 22F, and partially circumscribes the inner peripheral surf ace of the peripheral wall portion 21 at the inner peripheral surface at the other end of the projection 22F.

The projections 22A, 22B, 22C, 22D, 22E and 22F of the present invention can be applied to any structure having a rotor and a stator, in which a projection is uniformly in sliding contact with an entire abutment surface of comb teeth of a stator upon one entire rotation of the projection 22F (rotor 2). In particular, the present invention can be applied to any projection which is symmetrical with respect to the center of the rotor and has an abutment surface which is uniformly in press-contact with the entire abutment surface of the comb teeth during one rotation of the rotor with respect to the comb teeth.

The present invention can also be applied to a ultrasonic motor in which a disc portion is formed as a resilient member so as to provide a predetermined contact pressure on the abutment surface of the rotor, as disclosed in Japanese Unexamined Patent Publication No. 2000-60154. In this case, the same effect and mode of operation as those in the above-described first through sixth embodiments can be obtained by providing the projection according to the present invention at the abutment surfaces of the rotor and the stator.

Figure 11A:
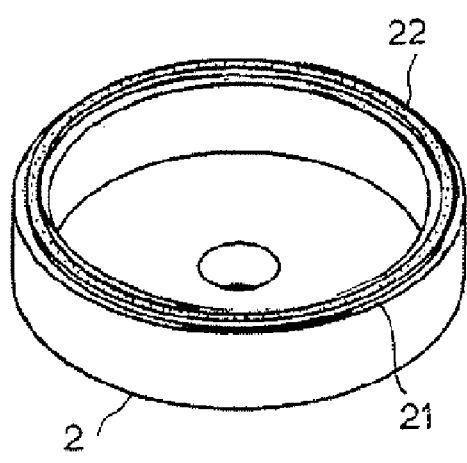
FIGS. 11A and 11B are a perspective view and a plan view of a rotor in a known ultrasonic motor.
Figure 11B:
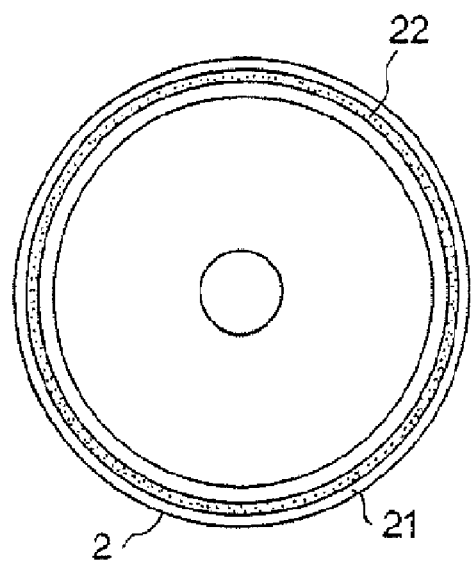
Figure 12B:
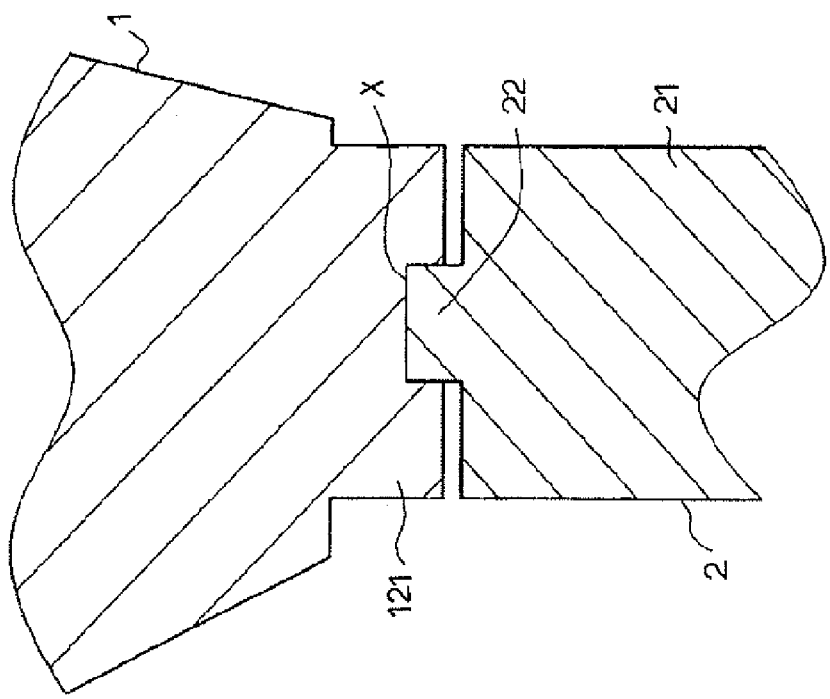
FIGS. 12A and 12B are sectional views showing the drawbacks of a known ultrasonic motor.
Figure 12A:
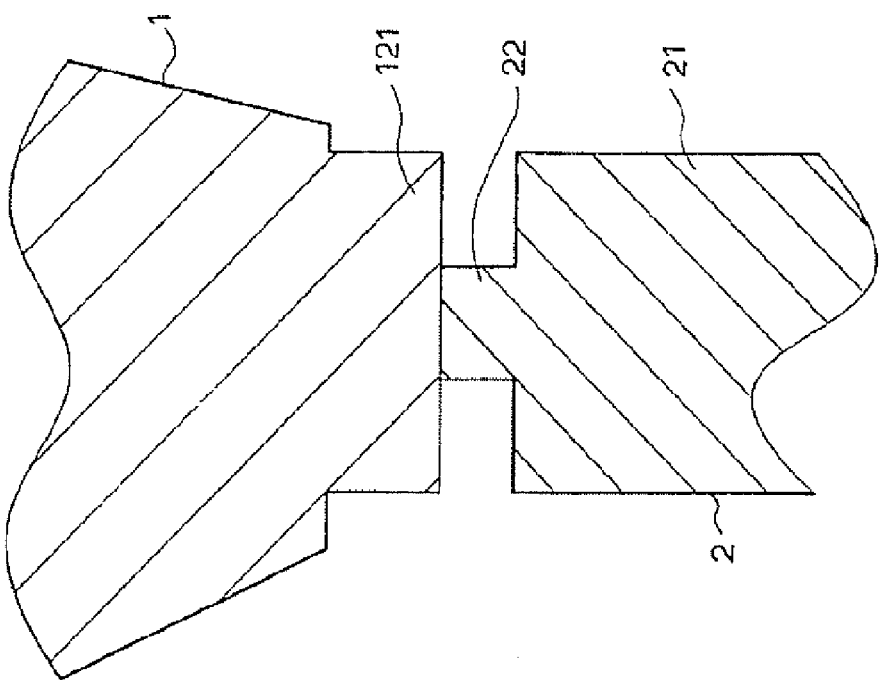

In contrast to the above-described first through sixth embodiments of the present invention, in the prior art shown in FIGS. 11A and 11B, the abutment surface of the peripheral wall portion 21 of the rotor 2 is provided with an annular projection 22 concentric with the peripheral wall portion 21, and width of the annular projection 22 makes the width of the abutment surface of the rotor 2 smaller than the width of the abutment surface of the stator 1. Accordingly, as shown in FIG. 12A, the abutment surfaces of the comb teeth 121 are continuously pressed onto the abutment surface of the projection 22 of the rotor 2 only at a part thereof with respect to the radial direction (width direction). Consequently, the abutment surfaces of the comb teeth 121 are partly worn only at the portion thereof that is always in press contact with the abutment surface of the annular projection 22. As a result, as shown in FIG. 12B, a depression or groove X due to a partial wearing is produced in the abutment surfaces of the comb teeth 121. The depressions or grooves X cause an abnormal press-contact between the abutment surfaces of the rotor 2 and the stator 1, so that an abnormal rotation such as an irregular or eccentric rotation of the rotor occurs due to an irregular frictional force. This reduces the service life of the ultrasonic motor.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An ultrasonic motor comprising:
a circular stator having a piezoelectric element and a comb-tooth body having a plurality of comb teeth which are circumferentially arranged thereon; and
a circular rotor having a rotation shaft, said circular rotor being in press-contact with said comb teeth of said circular stator,
wherein said circular rotor is provided with a projection which is in said press-contact with said comb teeth, wherein a width of said projection is smaller than a radial width of said comb teeth, and wherein a radial position of said projection varies along a circumferential direction of said circular rotor.

2. The ultrasonic motor according to claim 1, wherein the width of said projection in the radial direction is determined so as to provide a predetermined frictional force due to said press-contact with said comb teeth.

3. The ultrasonic motor according to claim 2, wherein a shape of said projection, as viewed in an axial direction of said rotation shaft, is determined so that said projection contacts substantially the entire area of abutment surfaces of said comb teeth in the radial direction upon one entire rotation of said circular rotor.

4. The ultrasonic motor according to claim 3, wherein said shape of said projection is circular and eccentric with respect to said rotation shaft of the circular rotor.

5. The ultrasonic motor according to claim 3, wherein said shape of said projection is elliptical.

6. The ultrasonic motor according to claim 3, wherein an outer periphery of said projection inscribes an outer periphery of said comb teeth at a plurality of equi-angular portions and circumscribes an inner periphery of said comb teeth at portions connecting said plurality of equi-angular portions, as viewed in said axial direction.

7. The ultrasonic motor according to claim 6, wherein each of said portions connecting said plurality of equi-angular portions comprises a linear portion.

8. The ultrasonic motor according to claim 3, wherein said projection comprises a plurality of equi-angular arc portions provided at different radial positions.

9. The ultrasonic motor according to claim 3, wherein said shape of said projection is a spiral shape.

* * * * *